Figures 1, 2:
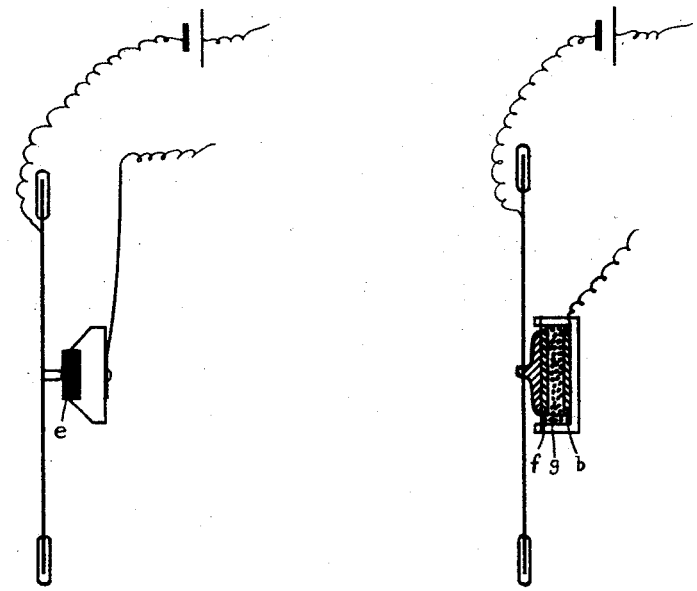

(No Model.)

W. W. JACQUES.
BATTERY TELEPHONE TRANSMITTER.

No. 535,247. Patented Mar. 5, 1895.

WITNESSES  INVENTOR.

UNITED STATES PATENT OFFICE.

WILLIAM W. JACQUES, OF NEWTON, ASSIGNOR TO THE AMERICAN BELL TELEPHONE COMPANY, OF BOSTON, MASSACHUSETTS.

BATTERY TELEPHONE-TRANSMITTER.

SPECIFICATION forming part of Letters Patent No. 535,247, dated March 5, 1895.

Application filed June 22, 1894. Serial No. 515,387. (No model.)

*To all whom it may concern:*

Be it known that I, WILLIAM W. JACQUES, of Newton, in the State of Massachusetts, have invented a new and useful Improvement in Variable-Resistance Telephone-Transmitters, of which the following is a specification.

The object of the invention is to take advantage of the high conductivity of metals in the production of electrodes or variable resistance mediums for variable resistance telephone transmitters.

Microphonic power depends, first, on the microphonic distance of the electrodes or variable resistance material; second, upon the electrical conductivity of the electrodes or variable resistance material.

By "microphonic distance" is meant the distance that two electrodes may be moved to and from each other without breaking the electrical circuit. Thus when it is said that the microphonic distance of a certain pair of anthracite electrodes is .000300 of an inch, it is to be understood that these electrodes may be moved to and from each other .000300 of an inch before interrupting the electrical current passing between them. Microphonic distance has sometimes been called microphonic excursion. It is readily observed with a microscope. The term "electrical conductivity" needs no definition.

The product of the total resistance of the longest line over which good commercial conversation can be carried on with a telephone, multiplied by the total capacity of the line, may be taken as the measure of the microphonic power of that telephone. The most convenient method of measuring the microphonic power of any given instrument having electrodes or a variable resistance medium composed of any particular substance is to connect it to a line, either an actual telephone line of such length that the resistance of the terminal instruments may be neglected or to an artificial line of similar resistance, and gradually increase the length of line until the limit of the transmission of good commercial conversation is reached. It is immaterial whether an artificial line or an actual line is used, provided of course that the actual line is in good order. Subjected to this test the non-metallic elements (excepting carbon whose conductivity is well known, and excepting also boron and silicon which may be so prepared as to become conductors) have so low an electrical conductivity as to preclude their commercial use as variable resistance mediums in microphone transmitters.

The metallic elements, although they have excellent electrical conductivity, have so small a microphonic distance as to preclude their commercial use in the present state of the art as variable resistance mediums in microphone transmitters.

Mixtures, compounds or alloys of the non-metallic elements with each other have too low a conductivity to be used commercially in microphone transmitters.

Mixtures, compounds or alloys of the metallic elements with each other have too small a microphonic distance to be used commercially in microphone transmitters.

Mixtures of metallic and non-metallic elements do not make commercial microphones.

Chemical compounds of metallic and non-metallic elements either have too low an electrical conductivity or too small a microphonic distance to permit of their use commercially in microphones.

Metallic elements and their alloys which, as stated above, have excellent electrical conductivity but small microphonic distance, may have their microphonic distance greatly increased without materially changing their conductivity, by chemically acting upon their surfaces with non-metallic elements or radicals. In this way many excellent variable resistence materials of high conductivity and great microphonic distance may be produced, whether in the form of buttons for use in transmitters of the Blake type, or in the form of granules for use between metallic electrodes in transmitters of the Hunnings type.

The process of treating metals to increase their microphonic distance may be more fully described as follows: I take any metal and form it into a button say of the size and shape of the carbon button used in the Blake transmitter, or into granules of say the size of the granules of carbon used in the solid back transmitter, according to the type of transmitters it is desired to use. I then subject the metal to the action of such reagents as will convert its service into a compound of that metal with a suitable non-metallic element or radical. Some metals are better than others, as, for example, iron is generally better than tin, and some salts are generally better than others, as, for example, sulphides are generally better than oxides; but in general, any metal may have its microphonic distance increased, without materially changing its conductivity, by the transformation of its surface into a salt into which the metal itself has entered as a part.

Details of the process of attaining my results vary, but the following examples will enable those skilled in the art to practice the invention generally. Thus, I may take a button of iron and heat it with sulphur until its surface is converted into sulphide of iron, when it will be found to possess excellent microphonic power; or I may treat the surface of the button with hydrochloric or sulphuric acids to convert the surface into the chloride or sulphate of iron; either of which impart to the button excellent microphonic power; or I may take iron granules of say .02 of an inch in diameter and treat them with sulphur or hydrochloric acid, or sulphuric acid, to convert the surfaces of the granules into, respectively, the sulphide, chloride or sulphate of iron. The iron granules, so treated, will be found to be excellent variable resistance mediums for use in transmitters of the Hunnings type; or I may take silver, either in the form of a button or in granules, and heat it in a vessel through which a stream of sulphureted hydrogen is passed, until its surface assumes a black velvet-like appearance, due to the formation of a coating of silver sulphide; or I may, by well known means, convert the surface of the silver into chloride, bromide or iodide of silver as a coating for the button or granules.

Very striking results are obtained by taking metallic platinum, which has entirely too small a microphonic distance to allow of its commercial use in microphone transmitters converting the surface of the platinum into a nitrate or chloride of platinum and then reducing this salt by the further action of a suitable alkali. After this treatment the surface of the platinum assumes a soft, black, velvety appearance and has now excellent microphonic power.

In general, the surface of any metallic element, or alloy composed of metallic elements, may be combined with any non-metallic element, or with a radical consisting of non-metallic elements or metallic and non-metallic elements, and have its microphonic distance thereby increased, without materially changing its electrical conductivity; although, as before stated, the microphonic power thereby secured varies considerably according to the metal chosen and the salt into which its surface is thus converted.

The surfacing of the non-metals is outside of my invention. Carbon, boron, and silicon, have already in themselves or may be so prepared as to have in and of themselves sufficient microphonic power independent of any coating or surfacing. The rest of the non-metals are insulators or practically insulators, and so are obviously outside of my invention.

In the drawings: Figure 1 represents in diagram the well known Blake transmitter, a variable resistance telephone of the single contact type. Fig. 2 represents in diagram the long distance transmitter in general use, a battery telephone of the Hunnings or granular type.

In the first named telephone the button electrode $e$ is of metal with its surface converted into one of its own salts, according to my invention. In all other respects the instrument is precisely like the Blake transmitter in ordinary use. In the other telephone the granules $g$ are of metal with their surfaces converted into a compound of the metal itself with a suitable non-metallic element or radical. The plates $b$ and $f$ usually in telephones of this type called respectively the back and front electrodes are of any highly polished conducting material. In other respects this instrument follows the construction of the instrument known as the long distance solid back transmitter.

Examples hereinbefore given are instances in which my invention may be practiced with the best results. It may be well, however, to give further specific instances in which the use of the invention is attended with highly favorable results. Among the best instances not hereinbefore specifically stated are, iron with its surface converted into bromide, iodide, or fluoride of iron; manganese with its surface converted into peroxide or sulphide of manganese; cobalt with its surface converted into chloride, bromide, iodide, or oxide of cobalt; nickel with its surface converted into sulphide of nickel; tin with its surface converted into the sulphide, sulphate, bromide or iodide of tin; lead with its surface converted into sulphide or sulphate of lead; copper with its surface converted into the chloride of copper.

I claim—

1. In a telephone transmitter an electrode or variable resistance medium consisting of metal with its surface converted into one of its own salts.

2. The herein described method of increasing the microphonic distance of metal electrodes or variable resistance mediums for telephone transmitters and thereby increasing their microphonic power, consisting in converting the surface of buttons or granules of metal into a salt composed of the metal itself and a non-metallic element or radical.

WILLIAM W. JACQUES.

Witnesses:
WILLIAM W. SWAIN,
WM. SULLIVAN.